United States Patent [19]

Popescu et al.

[11] Patent Number: 4,877,059

[45] Date of Patent: Oct. 31, 1989

[54] VALVE

[75] Inventors: Ian C. Popescu, Krefeld; Rainer Lange, Neuburg/Donau, both of Fed. Rep. of Germany

[73] Assignee: Schubert & Salzer, Ingolstadt, Fed. Rep. of Germany

[21] Appl. No.: 190,709

[22] Filed: May 6, 1988

[51] Int. Cl.$^4$ .............................................. F16K 37/00
[52] U.S. Cl. ................... 137/637.1; 137/554; 137/613; 137/625.33
[58] Field of Search ............. 251/121; 137/637, 637.1, 137/613, 554, 625.3, 625.33

[56] References Cited

U.S. PATENT DOCUMENTS

| 2,081,860 | 5/1937 | Quick | 137/613 |
| 4,150,693 | 4/1979 | Genevey et al. | 137/625.3 |
| 4,200,120 | 4/1980 | Kimata et al. | 137/613 |
| 4,347,869 | 9/1982 | Strobel et al. | 137/554 |

FOREIGN PATENT DOCUMENTS 5511   6/1897  Norway ............................. 137/637

Primary Examiner—A. Michael Chambers
Attorney, Agent, or Firm—Dority & Manning

[57] ABSTRACT

A valve is equipped with a closing element capable of being adjusted by means of a valve shaft and equipped with a flow divider. The latter is equipped with an actuating drive by means of which the flow divider can be adjusted as a function of the degree of aperture or opening of the closing element of the valve. The flow divider may be installed downstream of the valve and is made in form of a sliding bolt valve with a flangeless housing. The valve shaft of the valve is equipped with a displacement transducer which detects its position and is connected via a control device to the actuating drive of the flow divider.

8 Claims, 1 Drawing Sheet

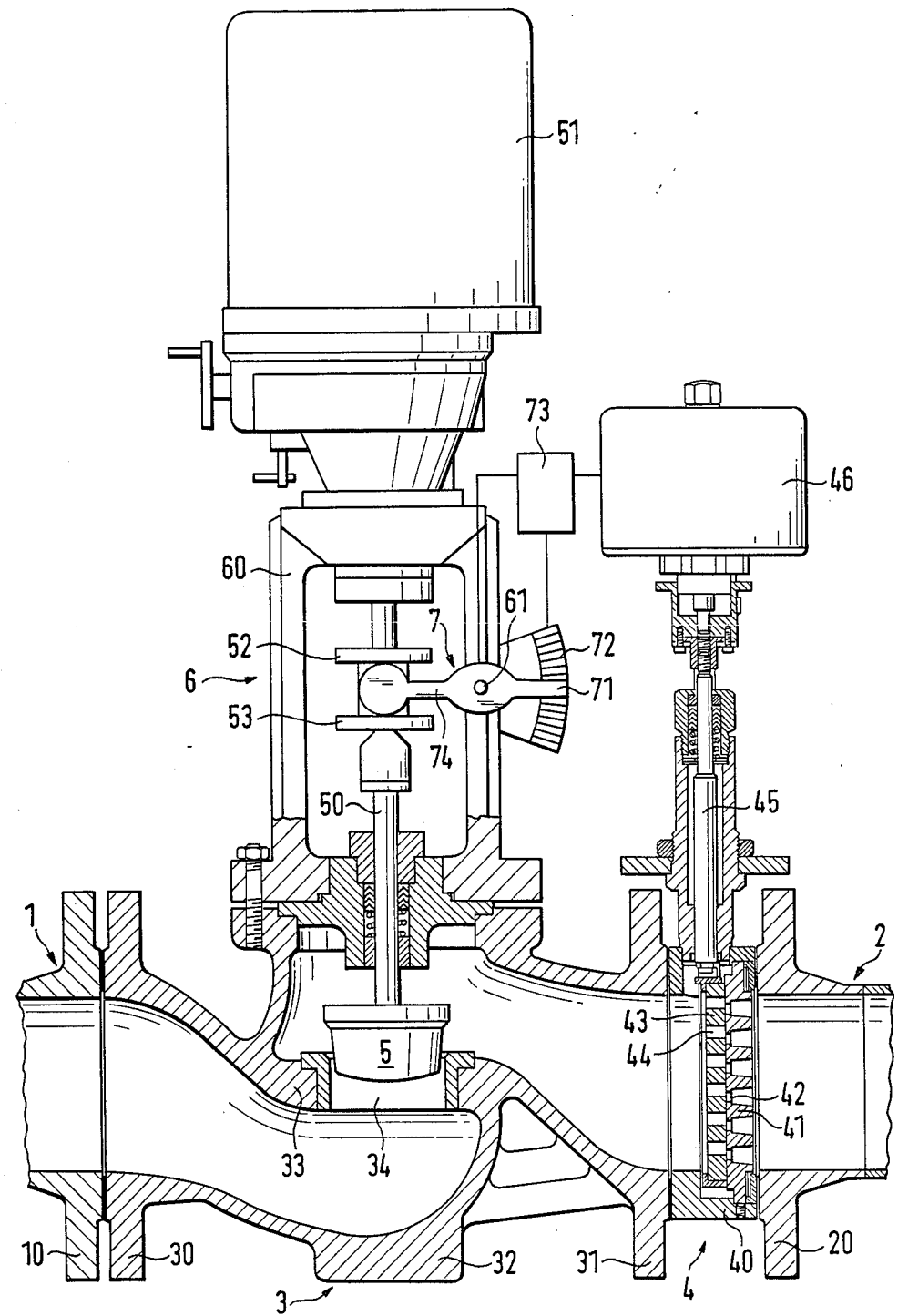

VALVE

BACKGROUND OF THE INVENTION

This invention relates to a valve with a closing element adjustable by means of a valve shaft and with a flow divider.

In practice, great differences in pressure between the inflow side and the outflow side are often encountered in control and regulating valves. This may be attributable to the fact that the valves are too large in relation to the supply line, or the reason for the differences may also lie in the particular construction of the valve. In all such cases, great problems of wear and noise arise. When liquids, e.g. hot water, are to be controlled the cavitation problem arises in particular through the fact that the water evaporates after leaving the controlled flow-through opening. Subsequently the normal pressure builds up once more with the accompanying collapse of the steam bubbles producing strong pressure waves which then lead to especially heavy wear and produce excessive noise.

According to a space-saving solution, a swage block is installed after the valve (Special printing 3320-18 of the company Eckardt AG, Stuttgart: "The Acoustic Field of Regulator Armatures and The Effect of Resistance Structures, Integrated or Installed Downstream, Upon the Regulating Technology Parameters" by H. Siemers). By using such a swage block the pressure is reduced in two steps, i.e. at the valve as well as at the swage block so that a way can be found for the pressure drop to no longer vary within the critical zone. However, a swage block has the disadvantage that this goal is not always reached in a satisfactory manner because said swage block can achieve its full effect only at a certain degree of aperture or opening of the closing element of the valve.

SUMMARY OF THE INVENTION

It is, therefore, the object of the instant invention to create a valve which counteracts wear and noise production independently of the degree of aperture or opening of the valve.

This object is attained, through the invention, in that the flow divider is provided with an actuating drive, by means of which said flow divider can be adjusted as a function of the degree of aperture of the closing element. Since the extent of the pressure drop varies as a function of the width to which the closing element is opened, it is possible to obtain an optimal adaptation to the flow-through conditions by means of the adjustable flow divider so that the locking or regulating device, according to the invention, operates with little noise and has less tendency to wear than the previously known devices with swage plates.

The flow divider preferably comprises two interacting control disks, one of which is stationary, with the other disk, facing it being adjustable so as to change the size of the uncovered aperture. The two interacting swage plates can thus open the apertures completely at first and can cover and thus reduce these openings to a certain degree in other positions. This linear or rotary adjustment of the movable swage plate is executed in response to the degree of aperture of the closing element so that the degree of effectiveness of the swage plate is always optimal since it can be selected as a function of the degree of aperture of the valve.

In one embodiment of the invention, the flow divider is made in form of a sliding bolt valve where, instead of an element serving only as a flow divider, such other elements can be used as can also be applied for other purposes in addition to the reduction of wear and noise.

To obtain an especially space-saving design, the sliding bolt valve is, preferably, provided with a flangeless housing and is installed between the valve flanges facing each other and a pipeline. Such a device can also be installed in an existing pipeline because such little space is required.

In principle such a flow divider can be installed before the valve, as a pressure drop in several steps can be obtained even then. However, the installation of the flow divider after the valve is especially advantageous. If necessary, such an arrangement can also be provided downstream of the stop or regulating valve in addition to a first flow divider installed upstream of the valve.

It is advantageous to equip the valve shaft of the valve with a displacement transducer which detects its position. In this way a simple and correct adjustment of the flow divider can be obtained in response to a change in the position of the valve closing element.

To achieve automatic adjustment of the flow divider to the degree of aperture or opening of the valve, an especially advantageous embodiment of the invention provides for the displacement transducer to be connected via a control device to an actuating drive of the flow divider.

In principle, the control device used to control the actuating drive of the flow divider can be of various designs. However, adjustment to different and especially favorable relationships between the degree of aperture of the valve and of the flow divider can be achieved if the control device is made in the form of a processor according to a further embodiment of the invention.

The invention makes it possible to reduce the wear and noise problems in valves in a simple manner. In addition, it is easy to retrofit such a device, especially if a flange-less sliding bolt valve is used as the flow divider. In case of valve failure and/or failure of its tightness (increasing leaks due to wear) the flow-through can also be controlled by means of the flow divider.

BRIEF DESCRIPTION OF THE DRAWING

The instant invention is explained in greater detail through the single figure of drawing of an embodiment of the invention.

DETAILED DESCRIPTION OF THE DRAWING

As the single drawing shows, a valve 3, e.g. a stop valve or a control valve as well as a flow divider 4 are installed between a supply line 1 and a flow-off line 2.

In the embodiment shown the supply line 1 as well as the flow-off line 2 are provided with flanges 10 and 20, by means of which the supply line 1 and the flow-off line 2 are connected to the flanges 30 and 31 of the valve 3.

As is normal, in general, valve 3 is equipped with a housing 32 provided with a flow-through opening 4 in an intermediate wall 33. This flow-through opening can be sealed by a closing element 5 or can be opened to a greater or lesser extent.

The closing element is located at the end of a valve shaft 50 which is connected by its end, outside of housing 32, to drive 51.

A frame 6, holding housing 32 and drive 51 at a mutual distance from each other, is provided between said housing 32 and said drive 51. The valve shaft 50 extending through the frame 6 is equipped with two collars 52 and 53 at a distance from each other between which one end 70 of a two-arm lever 74 ends. This lever 74 is supported pivotably on an axle 61 which is borne by a strut of frame 6. Lever 74 is part of a potentiometer constituting a displacement transducer 7, which senses and indicates the position of the closing element 5. For this purpose its other end 71 interacts with a resistance 72. The effective resistance, and thereby the voltage drop on the potentiometer, thus vary as a function of the pivoted position of lever 74.

Resistance 72 and lever 74 are each connected to a control device 73 which can be made in any manner desired and is for that reason indicated only schematically in the embodiment shown.

The flow divider 4 is made in form of a sliding bolt valve with a flangeless housing 40 in the embodiment shown, said housing being located between flange 20 of the outflow line 2 and facing flange 31 of valve 3.

The sliding bolt valve is provided, in a known manner, with a stationary control disk 41 having several slits 42 as well as with a control disk 43 equipped with slits 44 and capable of being moved relative to said stationary control disk 41. The movable control disk 43 is connected via a valve shaft 43 to an actuating drive 46 which is, in turn, controllably connected to the above-mentioned control device 73.

When valve 3, by means of closing element 5, releases the flow-through the pressure drops more or less in the area of closing element 5 as a function of the degree of aperture due to the high velocity of the controlled medium. With hot media especially, the boiling point is exceeded, in part in this manner, so that the medium, e.g. water, changes into steam. Subsequently the pressure of the medium increases again with the steam bubbles producing much noise as they are returned to the liquid state. To reduce this noise the medium is divided into several partial flows in the area of the flow divider 4. The flow processes are thereby acted upon so that much less noise is produced. Since the flow processes depend on the velocity of the flowing medium in the area between flow-through opening 34 and closing element 5, the opening size of the apertures in the flow divider 4 must be of appropriate dimensions. This is achieved in that the displacement transducer 7, constituted by lever 74 and resistance 72, senses the position of the closing element on valve shaft 50 and thereby produces a corresponding voltage drop. This voltage drop is signalled to the control device 73, which now causes the actuating device 46 to move in a corresponding manner so that it adjusts the movable valve plate 43 accordingly in relation to the facing, stationary valve disk 41.

The openings in the control disks 41 and 43 do not necessarily have to assume the form of slits 42 and 44 but can also have a different configuration depending upon the application. Neither is it necessary to provide a certain number of round or oblong slits. If slits are used, these can extend transversely or longitudinally to the direction of movement of the movable control disk 43, depending on the application. The movable control disk 43 can then be linearly adjustable or its relative position in relation to the stationary control disk 41 can be changed through rotation. Since the flow-through valve 3 is controlled it is not necessary for the two control disks 41 and 43 to be in close contact with each other. When the control disks 41 and 43 are in close contact with each other, i.e. when the flow divider 4 is made in form of a sliding bolt valve, it is possible to control flow-through in this way if this should become necessary because of a failure of valve 3, e.g. when too much leakage occurs because of a damaged seal.

Although the occurrence of cavitation for instance, or of shock waves in compressible media is dependent upon the degree of aperture of the closing element 5, it is not a linear function of said degree of aperture. An adjustment of the degree of aperture of the flow divider 4 to the degree of aperture of the closing element 5 and thereby to the occurring, overly critical flow conditions is possible due to the fact that the control device 73 does not transform the stroke movement of the valve shaft 50 linearly into a stroke movement of the valve shaft 45 of the flow divider. This is especially simple if the control device 73 is in form of a processor which can be programmed to the desired characteristic by interchanging blanks, programming, etc.

In the embodiment shown the displacement transducer 7 includes the potentiometer which is connected via control device 73 to the actuating drive 46 of the flow divider 4. However this is not an absolute requirement. The displacement transducer 7 can also be designed differently and could function inductively for example. The displacement transducer can, furthermore, also be integrated into the drive 51 of valve 3.

In its simplest embodiment the closing element 5 of valve 3 is manually adjustable. Similarly, the flow divider 4 can be manually adjustable, and the adjustment to the degree of aperture of valve 4 can then be effected by ear. According to another alternative, either drive 51, e.g. in form of a hand wheel, or valve shaft 50 is equipped with an indicating device making it possible to ascertain the degree of opening valve 3 so that the flow divider 4 can be adjusted accordingly, and an indicating device to show the applicable position of adjustment can also be provided here if desired. Adjustment of the flow divider 4 can then be effected in accordance with predetermined adjustment data derived from previously conducted tests to assign a given position of the flow divider 4 in response to a given degree of opening of valve 3.

It is not an absolute requirement for the sliding bolt valve to be equipped with a flangeless housing 40, even if this is an advantage from the point of view of space saving. It is, for instance, possible to connect the supply line 1 and the flow-off line 2 to a valve 3 and to the flow divider 4 by means of conventional screw connections. Neither is it absolutely necessary for the flow divider 4 to be made in form of a sliding bolt valve, as it does not normally have any locking or control function.

Valve 3 can also be made differently. For example, a stop valve, a control valve, a stroke valve, a valve with a rotating body, a sliding bolt valve, etc. can be used.

What is claimed is:

1. An adjustable flow valve for regulating the flow of liquids, comprising:
    (a) a valve seat having an opening through which the liquid flows;
    (b) an adjustable closing element, adapted to vary the liquid flow through said valve seat;
    (c) a flow divider disposed within the liquid flow path adjacent to said valve seat, having adjustable apertures for regulating the flow of the liquid and for dividing the liquid into a plurality of streams, and means for regulating the size of said apertures;

(d) sensing means for sensing the position of the closing element; and (e) control means, responsive to said sensing means, for varying the size of the apertures in said flow divider in response to variations in the position of said closing element to reduce cavitation noise and wear on the valve.

2. An adjustable flow valve as set forth in claim 1, wherein the flow divider comprises two interacting control disks, one of which is stationary and the other of which moves in relation to the stationary disk to change the size of the apertures in said flow divider.

3. An adjustable flow valve as set forth in claim 2, wherein the flow divider comprises a sliding bolt valve.

4. An adjustable flow valve as set forth in claim 3, wherein the sliding bolt valve is disposed within a flangeless housing.

5. An adjustable flow valve as set forth in claim 1, wherein the flow divider is disposed downstream from said valve seat.

6. An adjustable flow valve as set forth in claim 1, wherein said adjustable closing element is connected to a valve shaft and a displacement transducer for sensing its position.

7. An adjustable flow valve as set forth in claim 6, wherein the displacement transducer is connected to said control means for controlling the adjustment of the flow divider.

8. An adjustable valve as set forth in claim 7, wherein the control means comprises a processor.

* * * * *